United States Patent
Liang et al.

(10) Patent No.: US 12,413,979 B2
(45) Date of Patent: Sep. 9, 2025

(54) ROUTER NETWORKING METHOD AND SYSTEM, CHILD ROUTER, AND PARENT ROUTER

(71) Applicant: Huawei Technologies Co., Ltd., Shenzhen (CN)

(72) Inventors: Jian Liang, Shenzhen (CN); Zongbao Yu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 17/922,256

(22) PCT Filed: Apr. 6, 2021

(86) PCT No.: PCT/CN2021/085606
§ 371 (c)(1),
(2) Date: Oct. 28, 2022

(87) PCT Pub. No.: WO2021/218578
PCT Pub. Date: Nov. 4, 2021

(65) Prior Publication Data
US 2023/0188994 A1 Jun. 15, 2023

(30) Foreign Application Priority Data
Apr. 29, 2020 (CN) .......................... 202010358914.0

(51) Int. Cl.
*H04W 12/086* (2021.01)
*H04L 41/0806* (2022.01)
(Continued)

(52) U.S. Cl.
CPC ....... *H04W 12/086* (2021.01); *H04L 41/0806* (2013.01); *H04W 12/037* (2021.01); *H04W 48/16* (2013.01); *H04W 84/20* (2013.01)

(58) Field of Classification Search
CPC ..... H04L 41/0806; H04L 45/02; H04L 63/18; H04W 12/086; H04W 12/037;
(Continued)

(56) References Cited

U.S. PATENT DOCUMENTS

| | | | |
|---|---|---|---|
| 2005/0149757 A1* | 7/2005 | Corbett | H04L 63/102 726/4 |
| 2010/0177750 A1* | 7/2010 | Essinger | H04L 67/12 345/522 |

(Continued)

FOREIGN PATENT DOCUMENTS

| | | |
|---|---|---|
| CN | 106998279 A | 8/2017 |
| CN | 108134693 A | 6/2018 |

(Continued)

*Primary Examiner* — Benjamin M Thieu
(74) *Attorney, Agent, or Firm* — Conley Rose, P.C.

(57) ABSTRACT

A router networking method includes a child router that is coupled with an interface of the parent router, to be combined with the parent router, where a network corresponding to the interface is a first network, network isolation exists between the first network and a second network, and the second network is a local area network provided by the parent router. The child router accesses the first network and obtains networking information from the first network, where the networking information is used to access the second network. The child router is unplugged from the interface of the parent router to be detached from the parent router. The child router is coupled with a target interface, where a network corresponding to the target interface is the second network, and the child router accesses the second network based on the networking information using the target interface.

20 Claims, 6 Drawing Sheets

(51) Int. Cl.
*H04W 12/037* (2021.01)
*H04W 48/16* (2009.01)
*H04W 84/20* (2009.01)

(58) Field of Classification Search
CPC ..... H04W 48/16; H04W 84/20; H04W 12/03; H04W 12/069; H04W 12/35; H04W 12/50; H04W 40/22; H04W 12/08; H04W 24/02; H04W 40/246; H04W 84/18; H04B 3/544
See application file for complete search history.

(56) References Cited

U.S. PATENT DOCUMENTS

| | | | |
|---|---|---|---|
| 2015/0036545 A1* | 2/2015 | Lee | H04W 40/246 370/256 |
| 2015/0350022 A1* | 12/2015 | Lee | H04L 61/5038 709/226 |
| 2018/0375665 A1* | 12/2018 | Contenti | H04L 9/14 |
| 2019/0075073 A1* | 3/2019 | Erickson | H04W 4/70 |
| 2021/0083962 A1* | 3/2021 | Rabinowitz | H04L 41/0803 |
| 2023/0156563 A1* | 5/2023 | Cheng | H04W 40/248 370/254 |
| 2023/0188994 A1 | 6/2023 | Liang et al. | |

FOREIGN PATENT DOCUMENTS

| | | |
|---|---|---|
| CN | 108449125 A | 8/2018 |
| CN | 110808867 A | 2/2020 |
| CN | 111526510 A | 8/2020 |
| JP | 2006197060 A | 7/2006 |
| JP | 2009246414 A | 10/2009 |
| WO | WO-2018118150 A1 * 6/2018 | ......... H04L 63/0823 |

\* cited by examiner

ROUTER NETWORKING METHOD AND SYSTEM, CHILD ROUTER, AND PARENT ROUTER

CROSS-REFERENCE TO RELATED APPLICATIONS

This is a U.S. National Stage of International Patent Application No. PCT/CN2021/085606 filed on Apr. 6, 2021, which claims priority to Chinese Patent Application No. 202010358914.0 filed on Apr. 29, 2020. Both of the aforementioned applications are incorporated herein by reference in their entireties.

TECHNICAL FIELD

This application relates to the field of communications technologies, and in particular, to a router networking method and system, a child router, and a parent router.

BACKGROUND

As a bandwidth speed continuously increases, a user having requirements for a Blu-ray service and a mobile game service require that good Wi-Fi coverage can be obtained anywhere at home to ensure network speed and quality. Therefore, bundled routers are increasingly favored by a user with a large-sized house.

Currently, bundled routers in the market are usually connected through Wi-Fi/Ethernet/PLC (Power Line Communication, Power Line Communication). All routers in the bundled routers are independent individuals. During first configuration, for some bundled routers, a Wi-Fi parameter or a PLC parameter of the bundled routers may be pre-configured at delivery. After being powered on, a child router automatically scans a configured parent router to initiate automatic connection. However, self-networking may be unable to be implemented because a Wi-Fi coverage area or a factor interfering with Wi-Fi as well as phase crossing of a PLC power line or a factor interfering with the PLC power line are uncertain.

SUMMARY

In view of this, embodiments of this application provide a router networking method and system, a child router, a parent router, an apparatus, and a storage medium, to resolve a problem that self-networking between bundled routers may be unable to be implemented due to a Wi-Fi coverage area or a factor interfering with Wi-Fi as well as phase crossing of a PLC power line or a factor interfering with the PLC power line are uncertain.

According to a first aspect, an embodiment of this application provides a router networking method, including the following.

A child router is inserted into an interface of a parent router to be combined with the parent router. The child router accesses a first network by using the interface of the parent router, and obtains networking information from the first network. The child router is unplugged from the interface of the parent router and is inserted into a target interface, and accesses, based on the networking information, a second network corresponding to the target interface.

It may be understood that a specific implementation scenario of the router networking may be as follows.

A user inserts the child router into the interface of the parent router, where the parent router may be specifically placed in a living room in the user's house.

Then, after being inserted into the interface of the parent router, the child router accesses a network—the first network corresponding to the interface.

The first network is provided by the parent router. A to-be-connected device (such as the child router) may be inserted into the interface of the parent router by using a network cable head or a plug to access the first network, and communicate with the parent router by using the first network. It may be understood that the parent router and the child router may be considered as two nodes communicating with each other in the first network, and the two nodes exchange information by using a communications link established by using the first network.

In particular, the first network includes the networking information for accessing the second network, such as an ETH connection password, a Wi-Fi password, or a PLC domain password. The second network may be understood as a network used by a user to access the Internet daily, that is, a local area network provided by the parent router, and a wide area network may be connected to by using the local area network. It may be understood that, because network isolation exists between the first network and the second network, the communications link established between the parent router and the child router by using the first network may be considered as a secure link. The child router needs to be inserted to obtain the networking information, which can effectively ensure security of the networking information. A person except a residential user cannot obtain the networking information. It may be understood that the first network may be considered as a secure network for a device to exchange information with the parent router.

Then, the child router obtains the networking information when accessing the first network, to complete self-configuration of networking between the child router and the parent router.

Finally, the child router is unplugged from the interface of the parent router and is inserted into the target interface (for example, a socket, which corresponds to the second network) in a room with a relatively poor signal, and accesses the second network by using the networking information. In this case, the child router serves as a router for extending a signal of the parent router, and plays a function of enhancing a signal.

In this embodiment of this application, an interface is disposed on the parent router, to implement self-configuration of networking between the child router and the parent router. The child router can obtain accurate networking information in a secure network environment corresponding to the interface of the parent router, and access the second network based on the networking information through detachment, to extend a signal of the parent router.

With reference to the foregoing aspect and any possible implementation, an implementation is further provided. The interface for insertion includes a network cable interface or a power line interface. It may be understood that, in this embodiment of this application, an interface of the first network is specifically a physical interface, and can combine and detach the child router and the parent router.

With reference to the foregoing aspect and any possible implementation, an implementation is further provided. A manner of the network isolation includes physical isolation and/or software isolation, where the software isolation includes bridge isolation and/or IP layer isolation. It may be understood that network isolation exists between the first network and the second network, so that when the child router accesses the first network, it is equivalent to accessing a secure link. However, another user (for example, a neighbor) cannot access the secure link, and the child router may obtain the networking information from the first network.

With reference to the foregoing aspect and any possible implementation, an implementation is further provided. That the child router accesses a first network and obtains networking information from the first network includes the following.

The child router decrypts, by using a preconfigured decryption algorithm, an encrypted domain password broadcast in the first network to obtain a decrypted domain password. The child router accesses the first network based on the decrypted domain password, and obtains the networking information from the first network. It may be understood that the child router needs to perform decryption to access the first network. Both an encryption algorithm and a decryption algorithm that are respectively for the first network and the child router may be set by a manufacturer. Other different bundled routers cannot access the first network even if they can be inserted into the interface of the parent router, thereby further improving security of the first network.

With reference to the foregoing aspect and any possible implementation, an implementation is further provided. The accessing a second network based on the networking information includes the following.

The child router performs network access authentication by using the networking information, and the child router accesses the second network when the networking information meets a condition for accessing the second network. It may be understood that an authentication process is a verification process. For example, when accessing the second network by using a PLC interface, the child router performs authentication based on a domain password configured for the child router, that is, determines, based on the domain password, a network specifically accessed by the child router. There may be a plurality of second networks, and the second network can be accurately accessed through network access authentication.

With reference to the foregoing aspect and any possible implementation, after the child router is inserted into the interface of the parent router to be combined with the parent router, the method further includes: determining whether the child router is in a delivery state: and resetting, if the child router is in a non-delivery state, the child router to be restored to a delivery state. It may be understood that some faults may occur during use of the child router and the parent router, and consequently, the child router cannot be networked with the parent router. A child router that is faulty during use is usually in a non-delivery state. When a fault occurs, a delivery status may be determined after the child router is inserted into the parent router, to reset self-networking to re-synchronize combination information of the child router.

With reference to the foregoing aspect and any possible implementation, an implementation is further provided. The resetting, if the child router is in a non-delivery state, the child router to be restored to a delivery state includes the following.

If the child router is in a non-delivery state, the child router randomly generates a first parameter, and sends the first parameter to the parent router.

The child router receives a concatenated parameter sent by the parent router, where the concatenated parameter is obtained through encryption by using a preconfigured public key after a second parameter randomly generated by the parent router is concatenated with the first parameter.

The child router decrypts the concatenated parameter by using a preconfigured private key, and determines whether a result obtained through decryption is the same as the first parameter. If the result is the same as the first parameter, the child router sends reset request information to the parent router, where the preconfigured private key is paired with the preconfigured public key.

The child router receives reply information sent by the parent router, where the reply information includes a character string obtained through encryption by using the preconfigured public key after the first parameter, the second parameter, and a reset instruction are concatenated.

The child router decrypts the reply information by using the preconfigured private key, and determines whether a result obtained through decryption is the same as the first parameter and the second parameter. If the result is the same as the first parameter and the second parameter, the child router is reset based on the reset instruction to be restored to a delivery state.

It may be understood that security and accuracy of resetting the child router can be improved through encryption by using a character string.

With reference to the foregoing aspect and any possible implementation, an implementation is further provided. The child router is reset to be restored to a delivery state based on a DHCP. After the child router is inserted into the parent router, the DHCP can be used to trigger an operation of resetting the child router, to automatically reset the child router and re-network the child router with the parent router.

According to a second aspect, an embodiment of this application provides a router networking method, including the following.

A parent router is combined with a child router by using an interface of the parent router, where a network corresponding to the interface of the parent router is a first network, network isolation exists between the first network and a second network, and the second network is a local area network provided by the parent router.

The parent router provides networking information for the child router by using the first network, so that the child router accesses the second network based on the networking information, and serves as a router for extending a signal of the parent router. With reference to the foregoing aspect and any possible implementation, an implementation is further provided. The interface includes a network cable interface, a wireless network interface, or a power line interface.

It may be understood that a specific implementation scenario of the router networking may be as follows.

A user inserts the child router into the interface of the parent router, where the parent router is placed in a living room in the user's house.

Then, after being inserted into the interface of the parent router, the child router accesses a network—the first network corresponding to the interface. The first network is provided by the parent router. A to-be-connected device (such as the child router) may be inserted into the interface of the parent router by using a network cable head or a plug to access the first network, and communicate with the parent router by using the first network. It may be understood that the parent router and the child router may be considered as two nodes communicating with each other in the first network, and the two nodes exchange information by using a communications link established by using the first network. It should be noted that in an embodiment, the to-be-connected device can access the first network only by being physically inserted into the interface of the parent router.

In particular, the first network includes the networking information for accessing the second network, such as an ETH connection password, a Wi-Fi password, or a PLC domain password. The second network may be understood as a network used by a user to access the Internet daily, and a neighbor of the user may access the second network if the neighbor has the networking information. It may be understood that, because network isolation exists between the first network and the second network, the communications link established between the parent router and the child router by using the first network may be considered as a secure link. The child router needs to be inserted to obtain the networking information, which can effectively ensure security of the networking information. A person except a residential user cannot obtain the networking information. It may be understood that the first network may be considered as a secure network for a device to exchange information with the parent router.

Then, the child router obtains the networking information when accessing the first network, to complete self-configuration of networking between the child router and the parent router.

Finally, the child router is unplugged from the interface of the parent router and is inserted into a target interface (for example, a socket, which corresponds to the second network) in a room with a relatively poor signal, and accesses the second network by using the networking information. In this case, the child router serves as a router for extending a signal of the parent router, and plays a function of enhancing a signal.

In this embodiment of this application, an interface is disposed on the parent router, to implement self-configuration of networking between the child router and the parent router. The child router can obtain accurate networking information in a secure network environment corresponding to the interface of the parent router, and access the second network based on the networking information through detachment, to extend a signal of the parent router.

With reference to the foregoing aspect and any possible implementation, an implementation is further provided. The interface includes a network cable interface or a power line interface. It may be understood that, in this embodiment of this application, an interface of the first network is specifically a physical interface, and can combine and detach the child router and the parent router.

With reference to the foregoing aspect and any possible implementation, an implementation is further provided. A manner of the network isolation includes physical isolation and/or software isolation, where the software isolation includes bridge isolation and/or IP layer isolation. It may be understood that network isolation exists between the first network and the second network, so that when the child router accesses the first network, it is equivalent to accessing a secure link. However, another user (for example, a neighbor) cannot access the secure link, and the child router may obtain the networking information from the first network.

With reference to the foregoing aspect and any possible implementation, an implementation is further provided. An encrypted domain password is broadcast in the first network, so that the child router decrypts, by using a preconfigured decryption algorithm, the encrypted domain password broadcast in the first network to obtain a decrypted domain password, and accesses the first network based on the decrypted domain password to obtain the networking information. It may be understood that the child router needs to perform decryption to access the first network. Both an encryption algorithm and a decryption algorithm that are respectively for the first network and the child router may be set by a manufacturer. Other different bundled routers cannot access the first network even if they can be inserted into the interface of the parent router, thereby further improving security of the first network.

With reference to the foregoing aspect and any possible implementation, an implementation is further provided. After the parent router is combined with the child router by using the interface of the parent router, the method further includes: determining whether the child router is in a delivery state; and resetting, if the child router is in a non-delivery state, the child router to restore the child router to a delivery state. It may be understood that some faults may occur during use of the child router and the parent router, and consequently, the child router cannot be networked with the parent router. A child router that is faulty during use is usually in a non-delivery state. When a fault occurs, a delivery status may be determined after the child router is inserted into the parent router, to reset self-networking to re-synchronize combination information of the child router.

With reference to the foregoing aspect and any possible implementation, an implementation is further provided. The resetting, if the child router is in a non-delivery state, the child router to restore the child router to a delivery state includes the following.

If the child router is in a non-delivery state, the parent router receives a first parameter sent by the child router, where the first parameter is randomly generated by the child router.

The parent router randomly generates a second parameter, obtains a concatenated parameter through encryption by using a preconfigured public key after concatenating the second parameter and the first parameter, and sends the concatenated parameter to the child router.

The parent router receives reset request information sent by the child router, generates a reset instruction based on the reset request information, obtains a character string through encryption by using the preconfigured public key after concatenating the first parameter, the second parameter, and the reset instruction, and sends the character string to the child router as reply information.

If the child router succeeds in verifying the reply information, the parent router resets the child router by using the reset instruction, to restore the child router to a delivery state.

It may be understood that security and accuracy of resetting the child router can be improved through encryption by using a character string.

With reference to the foregoing aspect and any possible implementation, an implementation is further provided. The child router is reset to restore the child router to a delivery state based on a DHCP. After the child router is inserted into the parent router, the DHCP can be used to trigger an operation of resetting the child router, to automatically reset the child router and re-network the child router with the parent router.

According to a third aspect, an embodiment of this application provides a router networking system, including a parent router and a child router. The parent router includes an interface, and the interface of the parent router is configured to combine the child router and the parent router or detach the child router and the parent router. The child router and the parent router are configured to perform the following.

The child router is inserted into the interface of the parent router to be combined with the parent router, where a network corresponding to the interface of the parent router is a first network, network isolation exists between the first network and a second network, and the second network is a local area network provided by the parent router.

The child router accesses the first network.

The parent router provides networking information for the child router by using the first network, where the networking information is used to access the second network.

The child router obtains the networking information from the first network.

The child router is unplugged from the interface of the parent router to be detached from the parent router.

The child router is inserted into a target interface, where a network corresponding to the target interface is the second network.

The child router accesses the second network based on the networking information by using the target interface, where the child router serves as a router for extending a signal of the parent router.

With reference to the foregoing aspect and any possible implementation, an implementation is further provided. The interface of the parent router includes a network cable interface or a power line interface.

With reference to the foregoing aspect and any possible implementation, an implementation is further provided. The first network is provided by the parent router. When a to-be-connected device needs to access the first network, the to-be-connected device needs to be inserted into the interface of the parent router by using a network cable head or a plug, to access the first network, and communicates with the parent router by using the first network. The to-be-connected device includes the child router.

With reference to the foregoing aspect and any possible implementation, an implementation is further provided. A manner of the network isolation includes physical isolation and/or software isolation, where the software isolation includes bridge isolation and/or IP layer isolation.

With reference to the foregoing aspect and any possible implementation, an implementation is further provided. The child router is further configured to perform the following.

The child router decrypts, by using a preconfigured decryption algorithm, an encrypted domain password broadcast in the first network to obtain a decrypted domain password.

The child router accesses the first network based on the decrypted domain password.

With reference to the foregoing aspect and any possible implementation, an implementation is further provided. The child router is further configured to perform the following.

The child router performs network access authentication by using the networking information, and the child router accesses the second network when the networking information meets a condition for accessing the second network.

With reference to the foregoing aspect and any possible implementation, an implementation is further provided. The networking information includes an ETH connection password, a PLC domain password, or a Wi-Fi connection password.

With reference to the foregoing aspect and any possible implementation, an implementation is further provided. The parent router is further configured to perform the following:

determining whether the child router is in a delivery state; and resetting, if the child router is in a non-delivery state, the child router to restore the child router to a delivery state.

With reference to the foregoing aspect and any possible implementation, an implementation is further provided. The child router and the parent router are further configured to perform the following.

If the child router is in a non-delivery state, the child router randomly generates a first parameter, and sends the first parameter to the parent router.

The parent router receives the first parameter sent by the child router.

The parent router randomly generates a second parameter, obtains a concatenated parameter through encryption by using a preconfigured public key after concatenating the second parameter and the first parameter, and sends the concatenated parameter to the child router.

The child router receives the concatenated parameter sent by the parent router.

The child router decrypts the concatenated parameter by using a preconfigured private key, and determines whether a result obtained through decryption is the same as the first parameter. If the result is the same as the first parameter, the child router sends reset request information to the parent router, where the preconfigured private key is paired with the preconfigured public key.

The parent router receives the reset request information sent by the child router, generates a reset instruction based on the reset request information, obtains a character string through encryption by using the preconfigured public key after concatenating the first parameter, the second parameter, and the reset instruction, and sends the character string to the child router as reply information.

The child router receives the reply information sent by the parent router.

The child router decrypts the reply information by using the preconfigured private key, and determines whether a result obtained through decryption is the same as the first parameter and the second parameter. If the result is the same as the first parameter and the second parameter, the child router is reset based on the reset instruction to be restored to a delivery state.

With reference to the foregoing aspect and any possible implementation, an implementation is further provided. The child router is reset to restore the child router to a delivery state based on a DHCP.

According to a fourth aspect, an embodiment of this application provides a child router, including an access component corresponding to an interface of a parent router. The access component is configured to, together with the interface of the parent router, combine the parent router and the child router or detach the parent router and the child router. The child router includes a processor and a memory. The memory stores program instructions, and when the program instructions are executed by the processor, the child router is enabled to perform the router networking method according to the first aspect.

According to a fifth aspect, an embodiment of this application provides a parent router, including an interface of the parent router. The interface of the parent router is configured to, together with an access component that is in a child router and that corresponds to the interface of the parent router, combine the parent router and the child router or detach the parent router and the child router. The parent router includes a processor and a memory. The memory stores program instructions, and when the program instructions are executed by the processor, the parent router is enabled to perform the router networking method according to the second aspect.

According to a sixth aspect, an embodiment of this application provides a router networking apparatus. The apparatus includes several modules, and the modules enable the child router to perform the router networking method according to the first aspect.

According to a seventh aspect, an embodiment of this application provides another router networking apparatus. The apparatus includes several modules, and the modules enable the parent router to perform the router networking method according to the second aspect.

According to an eighth aspect, an embodiment of this application provides a non-volatile readable storage medium. The non-volatile readable storage medium stores program instructions, and when the program instructions are executed by a computer, the computer is enabled to perform the router networking method according to the first aspect.

According to a ninth aspect, an embodiment of this application provides another non-volatile readable storage medium. The non-volatile readable storage medium stores program instructions, and when the program instructions are executed by a computer, the computer is enabled to perform the router networking method according to the second aspect.

In the embodiments of this application, network isolation existing between the first network and the second network is used to accurately obtain the networking information from the first network without interference, and a function of automatic networking between the child router and the parent router is implemented by using the networking information. In this manner, during networking between the child router and the parent router, interference of a Wi-Fi coverage area or a factor interfering with Wi-Fi, phase crossing of a PLC power line or a factor interfering with the PLC power line, and the like can be ruled out, to successfully implement automatic networking. In addition, compared with a child router and a parent router in conventional bundled routers, the detachable and combinable combined routers in the embodiments of this application are independent of each other, and the detachable and combinable combined routers can implement a plug and play function.

DESCRIPTION OF EMBODIMENTS

The following describes the technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are only intended for a purpose of description, and shall not be understood as an indication or implication of relative importance or implicit indication of a quantity of indicated technical features. Therefore, a feature limited by "first" or "second" may explicitly or implicitly include one or more of the features. In the descriptions of embodiments of this application, "a plurality of" means two or more unless otherwise specified.

In embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of the word such as "example" or "for example" is intended to present a related concept in a specific manner.

Figure 1:
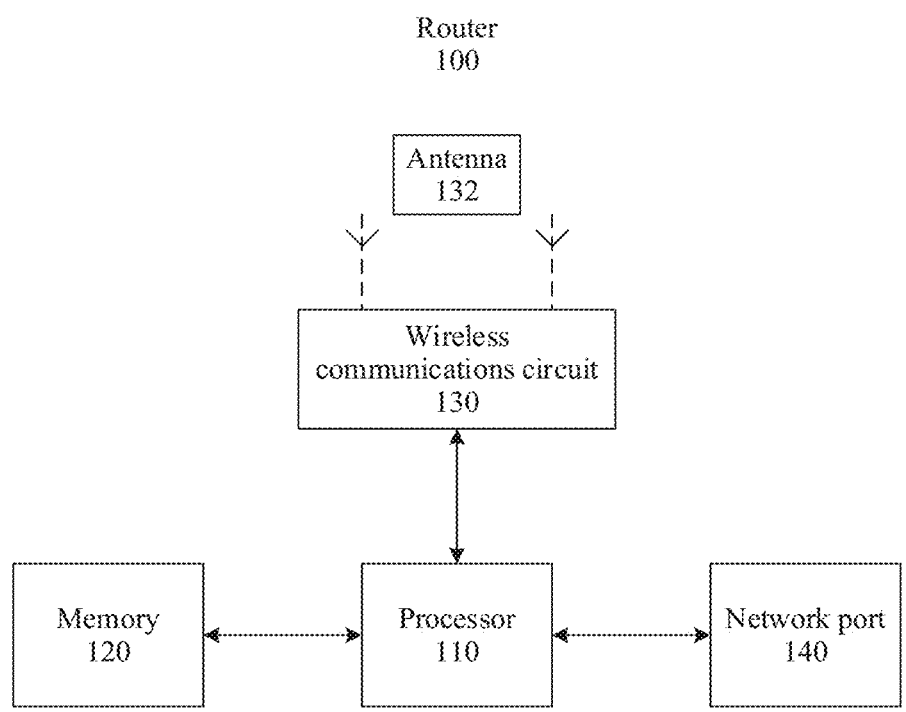
FIG. 1 is a schematic diagram of a structure of a router according to an embodiment of this application.

FIG. 1 is a schematic diagram of a structure of a router 100.

The router 100 may include a processor 110, a memory 120, a wireless communications circuit 130, an antenna 131, and a network port 140.

It may be understood that the structure shown in this embodiment of this application constitutes no specific limitation on the router 100. In some other embodiments of this application, the router 100 may include more or fewer components than those shown in the figure, or combine some components, or split some components, or have different component arrangements. The components shown in the figure may be implemented by using hardware, software, or a combination of software and hardware.

The memory 120 is configured to store instructions and data. The processor 110 may invoke the instructions or data stored in the memory 120. The network port 140 may include a wired network interface. The wired network interface may be configured to be coupled to an Internet network by using a wired network such as broadband, and may provide access for the Internet for a plurality of terminals. The network port 140 may also include a mobile communications module, and the mobile communications module may be configured to connect to a core network by using a wireless communications technology. The wireless communications circuit 130 may be configured to perform communication by using a wireless local area network standard such as a Wi-Fi network. The wireless communications circuit 130 may be one or more components integrating at least one communications processor module. The wireless communications circuit 130 may receive an electromagnetic wave by using an antenna 132, perform frequency modulation and filtering processing on an electromagnetic wave signal, and send a processed signal to the processor 110. The wireless communications module may further receive a to-be-sent signal from the processor 110, perform frequency modulation and amplification on the to-be-sent signal, convert the to-be-sent signal into an electromagnetic wave by using the antenna 132, and radiate the electromagnetic wave.

Figure 2:
FIG. 2 is a schematic diagram of bundled routers according to an embodiment of this application.

Currently, bundled routers in the market are usually in a form including a child router and a parent router. As shown in FIG. 2, both the child router and the parent router in the bundled routers are independent individuals and are detachable and cannot be combined. The child router is usually slightly less functional than the parent router. The child-parent router is mainly used in a large-sized house. For example, the parent router in placed in a living room in the large-sized house, and the child router is placed in a place at another location such as a room, so that the child router can be networked with the parent router, thereby enhancing strength of a signal covered by Wi-Fi at the location of the child router, and ensuring network speed and quality.

When the bundled routers are configured for the first time, configuration of a parent router needs to be first completed, for example, configured information such as a Wi-Fi connection password, a blacklist, a whitelist, a maximum quantity of users Who can access the parent router, and a user name. After configuration of the parent router is completed, a user may add a child router by using a related APP (application, application). Currently, for some bundled routers, a Wi-Fi or PLC parameter of the bundled routers may be preconfigured at delivery, so that after being powered on, a child router can automatically scan a configured parent router, and initiate automatic connection to the parent router based on the preconfigured Wi-Fi or PLC parameter. However, when the child router is placed at an improper location (for example, when information is received by using Wi-Fi at some locations, a data packet may be dropped). Networking configuration of the bundled routers cannot reach a success rate of 100% because a Wi-Fi coverage area or a factor interfering with Wi-Fi as well as phase crossing of a PLC power line or a factor interfering with the PLC power line are uncertain.

Further, for a house type that cannot be covered by bundled routers, a user needs to additionally purchase a single packaged (child) router in addition to the bundled routers for extension. However, due to a security requirement, a bundled parameter cannot be preconfigured for the single packaged router. When a network is extended, self-networking cannot be completed, and the user needs to perform configuration manually. Installation of the single packaged router cannot implement plug and play.

Figure 3:
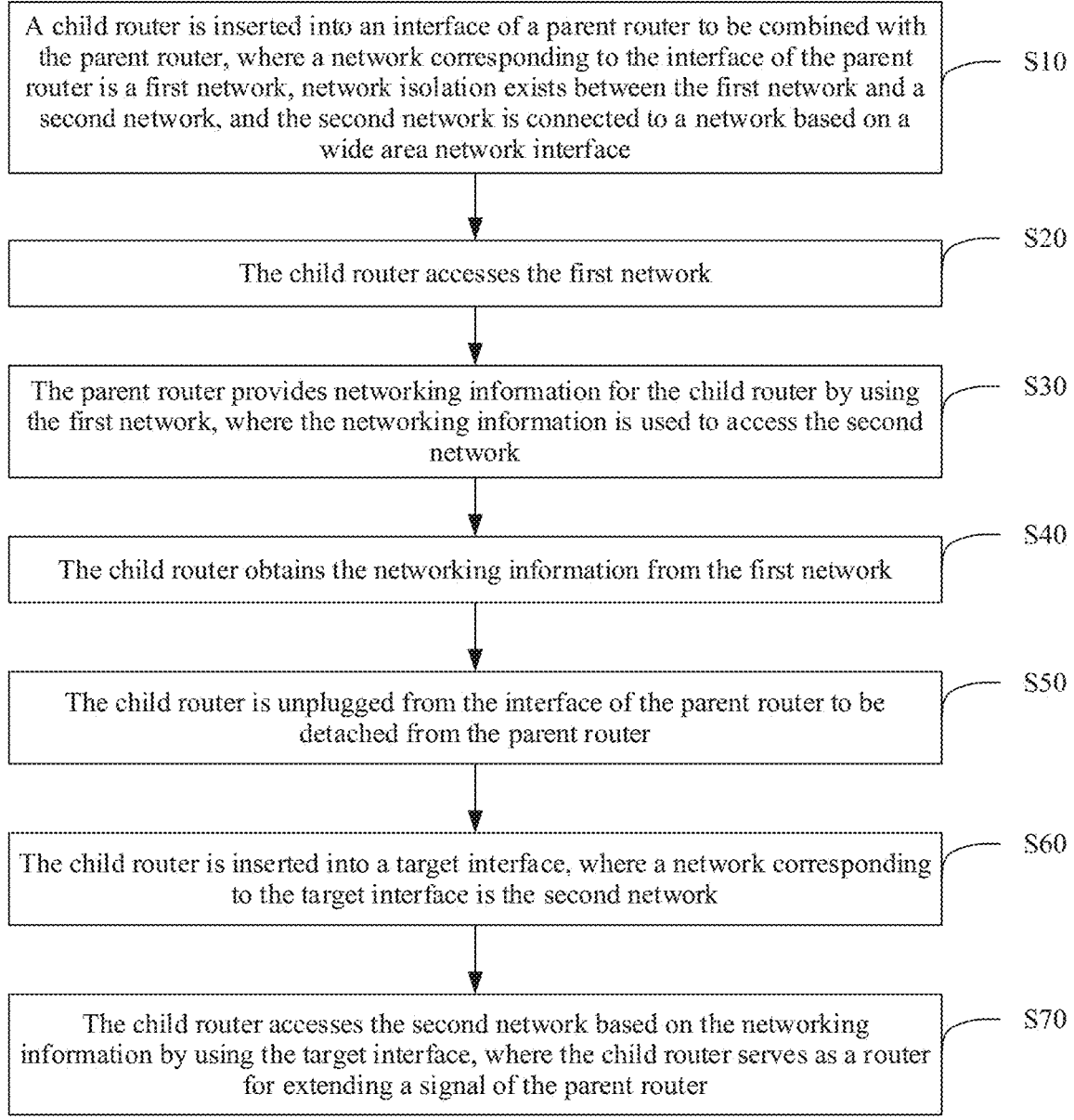
FIG. 3 is a flowchart of a router networking method according to an embodiment of this application.

An embodiment of this application provides a router networking method. As shown in FIG. 3, the method includes the following steps.

S10: Insert a child router into an interface of a parent router to be combined with the parent router, where a network corresponding to the interface of the parent router is a first network, network isolation exists between the first network and a second network, and the second network is a local area network provided by the parent router.

Compared with bundled routers in the conventional technology, the combined routers including the child router and the parent router are detachable and combinable, and the child router and the parent router may be used independent of each other or may be used together. The child router may be specifically connected to the parent router by using the interface of the parent router.

Figure 4:
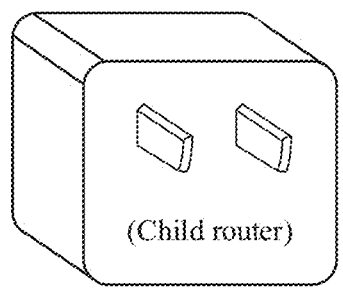
FIG. 4 is a schematic diagram of a structure of a child router according to an embodiment of this application.

FIG. 4 is a schematic diagram of a structure of a child router. As shown in FIG. 4, the child router includes a plug (which is a two-pin plug shown in the figure, and may be actually different types of plugs such as a three-pin plug), configured to be inserted into an interface of a parent router (which corresponds to the plug, and the interface of the parent router is specifically a socket).

Figure 5:
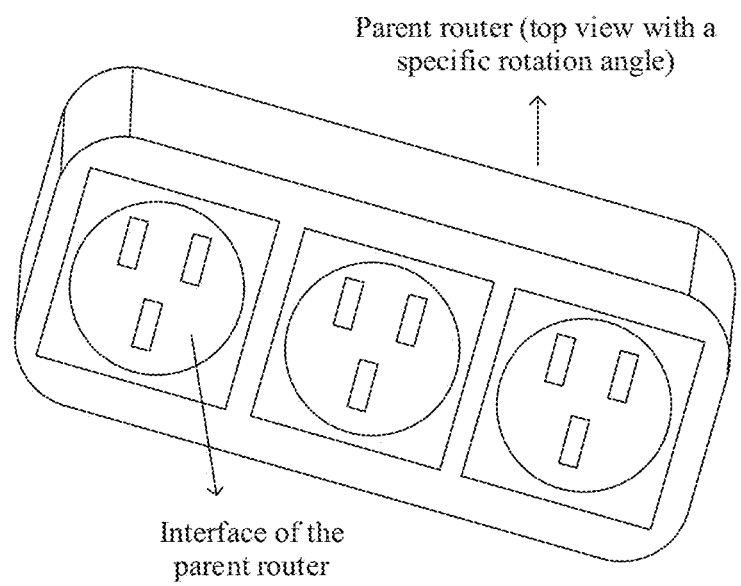
FIG. 5 is a schematic diagram of a structure of a parent router according to an embodiment of this application.
Figure 6:
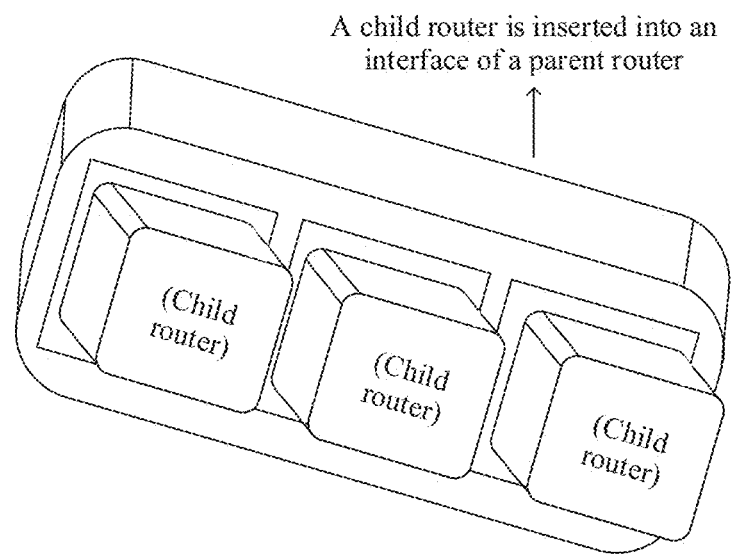
FIG. 6 is a schematic diagram obtained after a child router is inserted into an interface of a parent router according to an embodiment of this application.

FIG. 5 is a schematic diagram of a structure of a parent router. As shown in FIG. 5, a plurality of interfaces (sockets) are disposed on a base of the parent router, and a plug of a child router may be inserted into the socket on the base of the parent router, to connect the child router and the parent router. Specifically, FIG. 6 is a schematic diagram obtained after a child router is inserted into an interface of a parent router. It may be learned from FIG. 6 that the parent router may be connected to a plurality of child routers to combine with the child routers.

Further, the interface of the parent router may include an interface of a network port structure type (an interface used to connect to a network cable in a living scenario, which is usually referred to as a network port). When the interface of the parent router is the interface of a network port structure type, an access head of an access component of the child router is a network cable head of a network port structure type. A specific structure used for the interface of the parent router is not limited herein, and a structure type used for the access component of the child router corresponds to that used for the interface of the parent router.

Further, the interface into which the child router is inserted corresponds to the first network. The first network is provided by the parent router. When a to-be-connected device needs to access the first network, the to-be-connected device needs to be inserted into the interface of the parent router by using a network cable head or a plug, to access the first network. The to-be-connected device communicates with the parent router by using the first network. The to-be-connected device may be specifically the child router, or may be another electronic device that can be connected to the parent router by using the interface of the parent router.

Further, network isolation exists between the first network and the second network. The second network is a local area network provided by the parent router. A residential user may access a computing device such as a computer to the local area network provided by the parent router. The second network is connected to a network based on a wide area network (WAN) interface (the parent router is connected to the WAN interface to access a remote network such as the Internet). The computer of the user may be connected to the parent router by using a LAN interface, to access the local area network (that is, the second network) provided by the parent router, where the second network may be understood as a network used by a used to access the Internet daily. It may be understood that the WAN network is a remote network that connects computers in local area networks or metropolitan area networks in different regions to perform communication. The computer of the user may log in to a network such as the Internet after accessing the second network. After being connected to the second network, the computer of the user may perform network communication with electronic devices in different regions. In contrast, network isolation exists between the first network and the second network. The first network cannot be used to log in to a remote network such as the Internet, and cannot communicate with electronic devices in different regions. The child router can access the parent router only by being inserted into the interface of the parent router. It may be understood that, because network isolation exists between the first network and the second network, and the first network can be accessed only by being inserted into the interface of the parent router, a communications link established between the parent router and the child router by using the first network may be considered as a secure link. The child router needs to be inserted to obtain the networking information, which can effectively ensure security of the networking information. It may be understood that a person except a residential user cannot obtain the networking information. The first network may be considered as a secure network for a device to exchange information with the parent router.

A terminal device and the child router may access the second network through wireless connection (Wi-Fi), wired connection (by using an ETH interface or a PLC interface), or the like. In particular, the network corresponding to the interface of the parent router is the first network, and the first network is provided by the parent router. After the child router is inserted into the interface of the parent router to be combined with the parent router, a network accessed by the child router is the first network. It may be understood that, when the child router is inserted into a socket in a room in a house, a network corresponding to the socket that is in the room in the house and into which the child router is inserted is the second network. However, in this application, the child router accesses the first network after being combined with the parent router. The first network may be considered as a secure link, and network isolation exists between the first network and the second network.

In an embodiment, the child router is inserted into the interface of the parent router to be combined with the parent router. Network isolation exists between the second network and the first network corresponding to the interface of the parent router. It may be understood that the second network may be understood as ETH, Wi-Fi, or a PLC network that is in a user's house and that is used to access the Internet, and network isolation exists between the second network and the first network. The first network may be considered as a secure link and is used by only a residential user, and is not exposed outside as Wi-Fi used in the house. It may be understood that the first network may be considered as a secure network for a device to exchange information with the parent router. In contrast, the second network is different from the first network, and a user in another house may search a name of the second network (for example, Wi-Fi), and use the Wi-Fi after knowing a Wi-Fi connection password.

It may be understood that, because the Wi-Fi connection password needs to be known to connect to the Wi-Fi, the Wi-Fi connection password is not exposed in broadcast information of the Wi-Fi in a communications link of the Wi-Fi. In this embodiment of this application, through network isolation between the first network and the second network, a secure link may be provided to a user, so that the user can obtain networking information such as a Wi-Fi connection password by using the first network, to successfully connect to the second network.

It may be understood that, the child router is connected to the parent router by using an interface, and a secure link (the first network) is set through network isolation, to effectively rule out impact of a Wi-Fi coverage area or a factor interfering with Wi-Fi as well as phase crossing of a PLC power line or a factor interfering with the PLC power line, thereby helping the child router to successfully implement networking with the parent router.

S20: The child router accesses the first network.

S30: The parent router provides networking information for the child router by using the first network, where the networking information is used to access the second network.

S40: The child router obtains the networking information from the first network.

The networking information is information required by child router to access the second network. The networking information may specifically include an ETH connection password, a PLC domain password, or a connection password. For example, after accessing the first network, the child router may simultaneously obtain PLC domain information (such as a PLC domain password) and Wi-Fi access information (such as a Wi-Fi connection password), to access the second network. It may be understood that, for security consideration, the PLC domain information is not exposed to a PLC link of the second network, but may be indirectly obtained by using a PLC link of the first network. Similarly, the Wi-Fi access information is not exposed to the second network, but may be indirectly obtained by using the first network.

In an embodiment, the parent router provides the networking information for the child router by using the first network, and the child router may obtain the networking information after accessing the first network.

In an embodiment, the child router accesses the first network, and the child router can securely and quickly obtain the networking information from the first network by using a feature that network isolation exists between the first network and the second network. Through network isolation, the child router rules out impact of a Wi-Fi coverage area or a factor interfering with Wi-Fi as well as a phase crossing of a PLC power line or a factor interfering with the PLC power line, so that the child router can successfully and accurately obtain the networking information, and the child router can implement networking with the parent router.

S50: The child router is unplugged from the interface of the parent router to be detached from the parent router.

The child router and the parent router have a relationship in which the child router and the parent router can be combined and detached, and the child router may be combined with or detached from the parent router by using the interface of the parent router.

S60: The child router is inserted into a target interface, where a network corresponding to the target interface is the second network.

S70: The child router accesses the second network based on the networking information by using the target interface, where the child router serves as a router for extending a signal of the parent router.

The target interface may be specifically an interface at a location that is in a room in a user's house or the like and at which network coverage needs to be strengthened.

In an embodiment, after being unplugged from the parent router, the child router is plugged into an interface (for example, a socket of a PLC power line) at a location at which network coverage needs to be strengthened, to access the second network by using the target interface.

In an embodiment, the child router obtains the networking information by using the first network during connection to the parent router, which is equivalent to completing configuration of the child router when the child router is combined with the parent router. After the child router is inserted into the target interface, the child router may implement automatic networking with the parent router based on the completed configuration.

In an embodiment, a user may specifically perform an operation in an actual scenario based on the following steps: inserting the child router into the interface (such as a socket on a base) of the parent router, and then into an interface (such as a socket on a PLC power line) at another location that is in a room in a house or the like and at which network coverage needs to be strengthened, to complete automatic networking between the child router and the parent router. It should be noted that the child router inserted into the target interface is used as a router for extending a signal of the parent router. For example, the child router serves as a router with a relay function of the parent router.

In this embodiment of this application, network isolation existing between the first network and the second network is used to accurately obtain the networking information from the first network without interference, and a function of automatic networking between the child router and the parent router is implemented by using the networking information. In this manner, during networking between the child router and the parent router, interference of a Wi-Fi coverage area or a factor interfering with Wi-Fi, phase crossing of a PLC power line or a factor interfering with the PLC power line, and the like can be ruled out, to successfully implement automatic networking. In addition, compared with a child router and a parent router in conventional bundled routers, the detachable and combinable combined routers in this embodiment of this application are independent of each other, and the detachable and combinable combined routers can implement a plug and play function.

Further, in this embodiment of this application, the detachable and combinable combined routers may further keep the child router and the parent router in a connected state (the child router and the parent router are combined), that is, the child router may not be unplugged from the parent router. In this case, the child router and the parent router may use a channel planning instruction (which is used to plane a channel, and a user may input or preset the channel planning instruction on an application that manages the child router and the parent router) to enable the parent router and one or more accessed child routers to provide network services on different channels such as a 2.4 G band (which is not only a 2.4 G frequency, and the 2.4 G band is a frequency range). It may be understood that when the child router and the parent router remain in a connected state, the combined routers are used as a multi-frequency router, and the child router may access the second network through Wi-Fi connection. Further, a quantity of computer devices (such as a mobile phone, a computer, or another terminal) that are allowed to access a multi-frequency router increases accordingly. In this embodiment of this application, when the child router and the parent router remain in a connected state to server as a multi-frequency router, the multi-frequency router may be extended to a plurality of networks of different channels. In specific application, if a guest visits a user, the user may use the multi-band router to extend a guest network for use by the guest. Because the user and the guest use different channels, network use problems such as a device access quantity conflict and wireless interference between network users can be resolved. In addition, original bundled routers are usually used in a large-sized house. However, the detachable and combinable combined routers in this application are applicable to a large-sized house in a detached state, and may be extended to a plurality of networks of different bands in a combined state, to be applicable to a small-sized house.

Further, in step S10, the interface for insertion includes an interface that can access the first network, such as a network cable interface or a power line interface. The network cable interface may be specifically an ETH (Ethernet) interface, and the power line interface may be specifically a PLC interface. A PLC technology is a communication manner in which data and a media signal are transmitted by using a power line. In the technology, a high frequency that carries information is loaded into current, then information is transmitted by using a cable, and an adapter that receives the information separates the high frequency from the current and transmits the high frequency to a computer or a telephone to transmit information, so that the Internet may be accessed through broadband by using a PLC interface. It may be understood that, in this embodiment, an interface of the first network is specifically a physical interface, and can combine and detach the child router and the parent router. The interface of the first network further includes a wireless network interface, such as an interface used to connect to Wi-Fi. The wireless network interface is a virtual interface, and may also be used to access the second network. For example, after being inserted into the parent router, the child router may access the second network through Wi-Fi, so that a combination of the parent router and the child router is used as a multi-frequency router.

Further, in step S10, a manner of the network isolation includes physical isolation and/or software isolation, where the software isolation includes bridge isolation and/or IP layer isolation.

It may be understood that network isolation exists between the first network and the second network, so that when the child router accesses the first network, it is equivalent to accessing a secure link. However, another user (such as a neighbor) cannot access the secure link. When router networking is performed in a general case, incomplete networking information may be obtained during router networking due to impact of a Wi-Fi coverage area or a factor interfering with Wi-Fi as well as phase crossing of a PLC power line or a factor interfering with the PLC power line. As a result, networking cannot be performed normally, or the networking information is not obtained. Consequently, a step of network authentication (determining a specific network to access) cannot be performed. For example, when a location of the child router does not fall within Wi-Fi coverage, or a network signal is weak, or a radio network signal is interfered with, or the like, the child router cannot obtain accurate and complete networking information, which causes a networking failure. For another example, when there is phase crossing or interference of a power line on a PLC interface connected to the child router, the child router cannot obtain accurate and complete networking information. As a result, network authentication fails and the child router cannot access the second network.

In an embodiment, network isolation may be implemented through physical isolation and/or software isolation. When networking is implemented by using a PLC interface, a specific network isolation manner is physical isolation. Specifically, there are two independent PLC chips on the parent router, which are respectively a PLC chip 1 and a PLC chip 2. The parent router is inserted into a PLC link with strong power by using the PLC chip 1 and corresponds to a PLC domain 1, and accesses the second network. A socket on the parent router uses the PLC chip 2 and is supplied with weak power, corresponds to a PLC domain 2, and accesses the first network. It should be noted that strong power and weak power of PLC may be separated independently, and the PLC domain 1 and the PLC domain 2 do not affect each other. It may be understood that a circuit with strong power corresponding to the PLC domain 1 may be equivalent to a circuit used when power is used daily in a user's house. A circuit with weak power corresponding to the PLC domain 2 is different from the circuit with strong power corresponding to the PLC domain 1.

Further, in step S20, that the child router accesses the first network specifically includes: The child router decrypts, by using a preconfigured decryption algorithm, encrypted domain password broadcast in the first network to obtain a decrypted domain password. The child router is connected to the first network based on the decrypted domain password to obtain the networking information from the first network. It may be understood that the child router needs to perform decryption to access the first network. Both an encryption algorithm and a decryption algorithm that are respectively for the first network and the child router may be set by a manufacturer. Other different bundled routers cannot access the first network even if they can be inserted into the interface of the parent router, thereby further improving security of the first network.

Further, in step S40, that the child router accesses the second network based on the networking information by using the target interface specifically includes: The child router performs network access authentication by using the networking information, and the child router accesses the second network when the networking information meets a condition for accessing the second network. It may be understood that an authentication process is a verification process. For example, when accessing the second network by using a PLC interface, the child router performs authentication based on a domain password configured for the child router, that is, determines, based on the domain password, a network specifically accessed by the child router. It may be understood that there may be a plurality of second networks, and different second networks can be accurately accessed through network access authentication.

It may be understood that the network corresponding to the interface of the parent router is the first network, and the child router may access the first network after being inserted into the interface of the parent router. Network isolation exists between the first network and the second network. Compared with the second network, the first network may be considered as a secure link and is used by only a residential user. A terminal device, the child router, and the like may be wiredly (Wi-Fi) connected to the parent router (an ETH interface or a PLC interface) or wirelessly connected to the parent router, to access the second network.

In an embodiment, when the child router implements networking with the parent router by using a PLC interface (accessing the second network in which the parent router is located to enhance a network signal of the second network of the parent router), implementation steps in a specific scenario may be as follows: A user inserts the child router with a plug into a socket on a base of the parent router, and the child router preliminarily accesses the PLC domain 2 (a PLC domain password is not set in the child router by default). In this case, the child router accesses a secure link. Further, the secure link (the PLC domain 2) broadcasts an encrypted domain password encrypted by using a preconfigured algorithm. The child router may decrypt the encrypted domain password by using a preconfigured paired decryption algorithm, to obtain a domain password of the PLC domain 2. In this case, the child router formally accesses the PLC domain 2, and obtains and synchronizes a domain password of the PLC domain 1. The domain password of the PLC domain 1 can implement a function of the child router of automatically completing networking with the parent router. Then, the child router is inserted into a circuit with strong power after being unplugged, for example, inserted into a socket in a room in a user's house. The child router is connected to the PLC domain 1 based on the synchronized (configured) domain password of the PLC domain 1 (the PLC domain 1 corresponds to a circuit with strong power, that is, the user uses a network by using the PLC domain 1) to perform authentication, and determines whether the synchronously configured domain password of the child router is the same as a to-be-authenticated check password. After it is determined that the synchronously configured domain password of the child router is the same as the to-be-authenticated check password, the child router accesses the second network in which the parent router is located.

In this embodiment of this application, two independent PLC chips are disposed on the parent router to implement physical isolation and distinguish a circuit with strong power from a circuit with weak power. When being inserted into the parent router, the child router accesses the PLC domain 2 corresponding to the circuit with weak power, and when being inserted into the target interface, the child router accesses the PLC domain 1 corresponding to the circuit with strong power. A self-networking function in physical isolation is implemented by using the synchronized domain password of the PLC domain 1 in the PLC domain 2, which can rule out impact factors such as phase crossing of a power line crossover and power line interference, thereby ensuring that automatic networking between the child router and the parent router can be successfully completed.

In an embodiment, in addition to physical isolation, network isolation may be implemented through software isolation. Software isolation includes bridge isolation and/or IP layer isolation. Bridge isolation is a mechanism in which different network cable interfaces or PLC interfaces may be allocated to different bridge devices by using a bridge mechanism of a Linux kernel. The bridge device is a virtual network device and has a feature of a network device. An IP address and a MAC address (Media Access Control Address, media access control address, which is also referred to as a local area network address (LAN Address) or the like) may be configured in the bridge device. The bridge device is a virtual switch and has a function similar to that of a physical switch. It may be understood that, a common network device has only two ports, and data entering from one port goes out from the other port. For example, for a physical network card, data received from an external physical network is forwarded to a kernel protocol stack, and data from the protocol stack is forwarded to the external physical network. However, the bridge device has a different case. The bridge device may have a plurality of ports. Data may enter from any port, and a specific port from which the data is sent after the data enters may be determined based on the MAC address.

Figure 7:
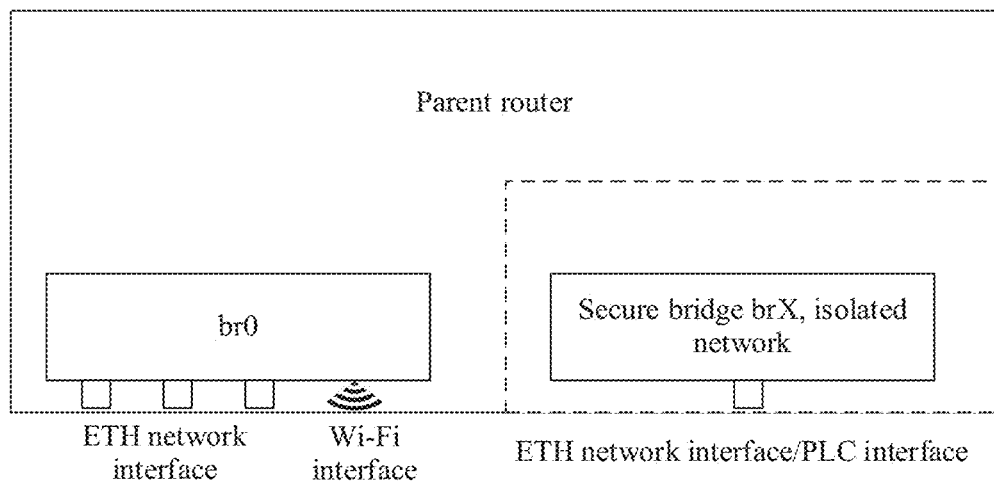
FIG. 7 is a schematic diagram of implementing network isolation from an aspect of a parent router according to an embodiment of this application.

In an embodiment, as shown in FIG. 7, br0 (which is a bridge device with a number 0, and the parent router may include one or more bridge devices) in the parent router is bound to a LAN (local area network, local area network) interface through which a user accesses the Internet normally, where the br0 may include an ETH network interface and a Wi-Fi interface (when a router needs to be connected to the second network, the router needs to use a WAN interface, and may be connected to the LAN interface in addition to being connected to the WAN interface in a fixed range such as a house, a school, or the like); and brX (which is a bridge device with a number X, where X is an integer greater than 0) includes an ETH network interface and/or a PLC interface. Through division of the br0 and the brX, network isolation may be implemented from a second layer (a MAC layer, which is also referred to as a data link layer) in a TCP/IP (Transmission Control Protocol/Internet Protocol, transmission control protocol/Internet protocol). Specifically, software isolation may be implemented by allocating different MAC addresses to the br0 and the brX. It may be understood that the br0 is bound to the LAN interface through the user accesses the Internet normally, which is equivalent to that the br0 is a side on which the user normally uses a network (the second network), and the br0 may further include a Wi-Fi interface (which is a virtual interface, and a terminal device may access the second network by using the Wi-Fi interface). The user may be connected to the second network by using the Wi-Fi interface when wireless signal coverage is fairly good. The brX may be considered as a secure bridge, which is separated from the br0 through network isolation in the MAC layer in the TCP/IP. Implementing networking by using software isolation, namely, bridge isolation, is similar to implementing networking by using physical isolation. A main difference lies in that the bridge device is a virtual network device.

In an embodiment, when networking is implemented based on bridge isolation by using an ETH network interface, a PLC interface, or the like, steps are implemented in a specific scenario may be as follows: The child router accesses, by using the ETH network interface or the PLC interface, the first network in which the secure bridge brX is located, and obtains and synchronizes the networking information from the first network. Then, the child router is unplugged from the parent router and inserted into the target interface, for example, an ETH network interface or a PLC interface in a room in a user's house; or the child router is connected to the Wi-Fi interface through wireless connection. Finally, the child router accesses the second network based on the networking information. It may be understood that, bridge isolation exists between the secure bridge brX and the bridge br0 corresponding to the second network. Therefore, after being inserted into the ETH network interface or the PLC interface of the secure bridge brX, the child router obtains, from the secure bridge, the networking information that does not appear in broadcast information of the br0, to synchronize the networking information and complete network configuration of networking, so that the child router can implement automatic networking based on the synchronized network configuration after accessing the target interface.

In an embodiment, IP layer isolation may be used to implement a function of automatic networking between the child router and the parent router. Specifically, IP layer isolation may implement software isolation by using IPTABLES. IPTABLES is an IP information packet filtering system integrated with a Linux kernel. When a Linux system is connected to the Internet or a LAN, or is connected to a proxy server of the LAN or the Internet, the IP information packet system can better control IP information packet filtering and complete firewall configuration in the Linux system. It may be understood that software isolation implemented by the IPTABLES is mainly isolation performed for a third layer (a network layer, which is also referred to as an IP layer) in the TCP/IP. Specifically, different network segments may be set for the br0 and the brX by using the IPTABLES, and network layer isolation between the br0 and the brX is formed in a routing path phase of the two network segments.

In an embodiment, similar to the steps implemented in the specific scenario of implementing networking by using bridge isolation, when networking is implemented based on IP layer isolation by using an ETH network interface, a PLC interface, or the like, steps are as follows: The child router accesses, by using the ETH network interface or the PLC interface, the first network in which the brX is located in a network segment 1 (a secure network segment), and obtains and synchronizes the networking information from the first network. Then, the child router is unplugged from the parent router and inserted into the target interface, for example, an ETH network interface or a PLC interface in a room in a user's house; or the child router is connected to the Wi-Fi interface through wireless connection. Finally, the child router accesses the second network based on the networking information. It may be understood that, IP layer isolation exists between the brX located in the secure network segment and the bridge br0 corresponding to the second network, after being inserted into the ETH network interface/Wi-Fi interface/PLC interface of the brX located in the secure network segment, the child router obtains and synchronizes the networking information from the secure network segment, to complete network configuration of networking, so that the child router can implement automatic networking based on the synchronized network configuration after accessing the target interface.

Further, bridge isolation and IP layer isolation may simultaneously exist, and jointly form entire software isolation. Compared with that bridge isolation and IP layer isolation are used separately, this has a better effect, so that implementation of automatic networking is more ensured. Further, physical isolation and software isolation may also simultaneously exist. For example, when software isolation is implemented, the PLC interface may be used at the same time, thereby further ensuring implementation of automatic networking.

Further, after step S10, that is, after the child router is inserted into the interface of the parent router, the following step is further included:

determining whether the child router is in a delivery state, and resetting, if the child router is in a non-delivery state, the child router to restore the child router to a delivery state.

It may be understood that some faults may occur during use of the child router and the parent router, and consequently, the child router cannot be networked with the parent router. A child router that is faulty during use is usually in a non-delivery state. When a fault occurs, a delivery status may be determined after the child router is inserted into the parent router, to reset self-networking to re-synchronize combination information of the child router. Specifically, when it is determined that the child router is in a delivery state, it indicates that the combination information of the child router is synchronized (the child router is configured) for the first time or is synchronized for the first time after being reset. When it is determined that the child router is in a non-delivery state, it indicates that the combination information of the child router is synchronized previously, and a reset operation may be performed on the child router in a non-delivery state. It may be understood that, when a fault occurs during networking, networking may be performed again by using a reset operation, and the networking information of the child router does not need to be manually reconfigured. A preset status identifier may be used to determine whether the child router is in a delivery state. For example, when the combination information of the child router is not synchronized or the combination information is not synchronized after being reset, a status identifier of the child router is 0. When the combination information of the child router is synchronized, the status identifier of the child router is 1.

Further, the step of resetting the child router to restore the child router to a delivery state further includes the following steps.

(1). The child router randomly generates a first parameter, and sends the first parameter to the parent router.

(2). The child router receives a concatenated parameter sent by the parent router, where the concatenated parameter is obtained through encryption by using a preconfigured public key after a second parameter randomly generated by the parent router is concatenated with the first parameter.

(3). The child router decrypts the concatenated parameter by using a preconfigured private key, and determines whether a result obtained through decryption is the same as the first parameter. If the result is the same as the first parameter, the child router sends reset request information to the parent router, where the preconfigured private key is paired with the preconfigured public key.

(4). The child router receives reply information sent by the parent router, where the reply information includes a character string obtained through encryption by using the preconfigured public key after the first parameter, the second parameter, and a reset instruction are concatenated.

(5). The child router decrypts the reply information by using the preconfigured private key, and determines whether a result obtained through decryption is the same as the first parameter and the second parameter. If the result is the same as the first parameter and the second parameter, the child router is reset based on the reset instruction to be restored to a delivery state.

It may be understood that security and accuracy of resetting the child router can be improved through encryption by using a character string.

In an embodiment, the step of resetting the child router to restore the child router to a delivery state may be specifically implemented based on an extended DHCP (Dynamic Host Configuration Protocol, dynamic host configuration protocol) procedure. Specifically, an option (option) packet in the DHCP may be used to exchange information, to ensure that after the child router is inserted into the parent router, the child router is automatically reset and is re-networked with the parent router.

Figure 8:
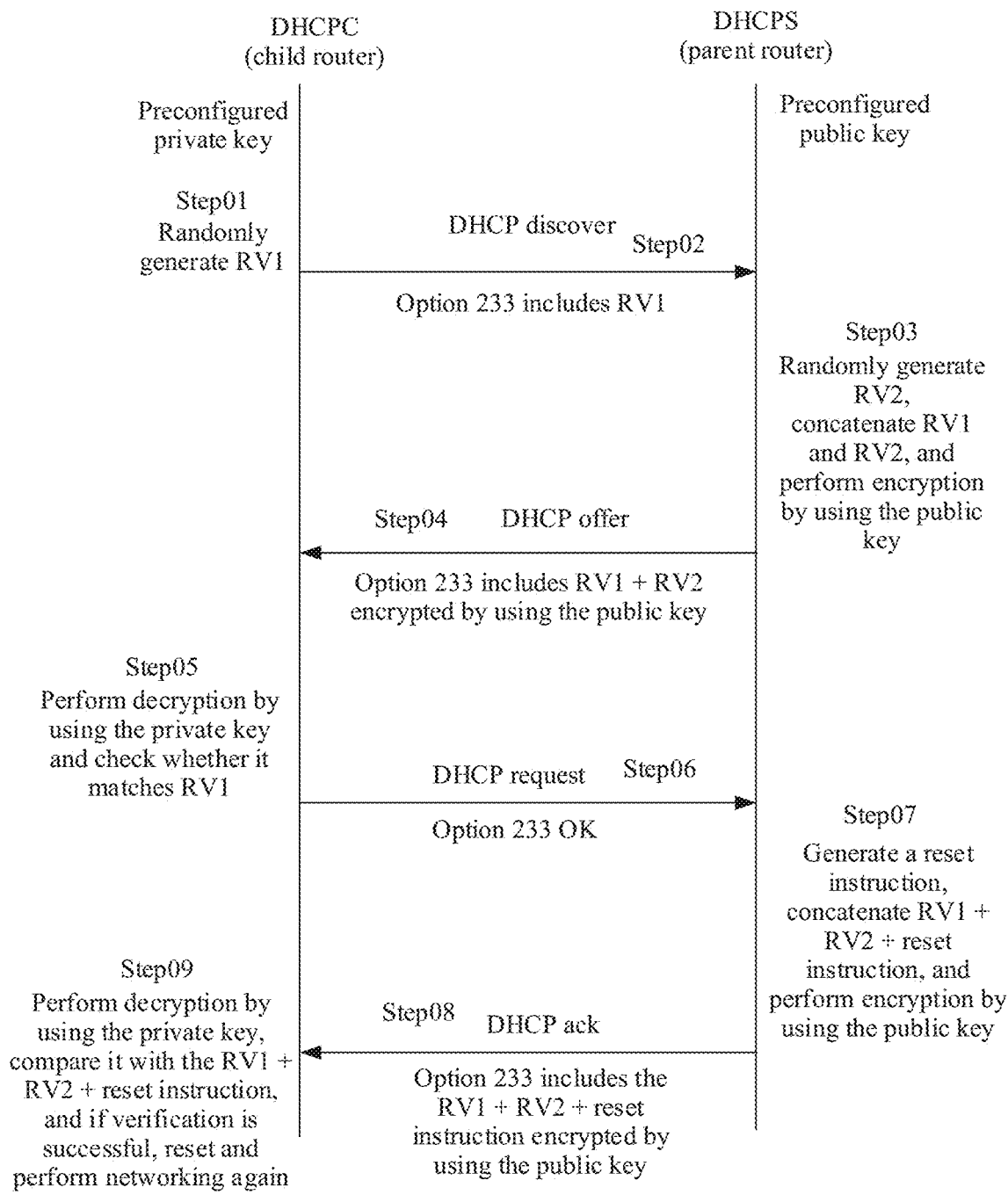
FIG. 8 is an interaction flowchart of delivering a reset instruction by using a DHCP procedure according to an embodiment of this application.

FIG. 8 is an interaction flowchart of delivering a reset instruction by using a DHCP procedure. Specifically, the following steps are included.

Step 01: A child router randomly generates a first parameter RV1.

Step 02: The child router sends, to a parent router by using a DHCP discover, an Option 233 packet including RV1.

Step 03: The parent router receives and obtains RV1 sent by the child router. The parent router randomly generates a second parameter RV2, and obtains a concatenated parameter through encryption by using a preconfigured public key after concatenating RV2 and RV1.

Step 04: The parent router sends the concatenated parameter to the child router.

Step 05: The child router receives the concatenated parameter sent by the parent router. The child router decrypts the concatenated parameter by using a preconfigured private key, and determines whether a result obtained through decryption is the same as RV1.

Step 06: If the result is the same as RV1, the child router sends reset request information to the parent router, where the preconfigured private key is paired with the preconfigured public key.

Step 07: The parent router receives the reset request information sent by the child router, generates a reset instruction based on the reset request information, and obtains a character string through encryption by using the preconfigured public key after concatenating RV1, RV2, and the reset instruction.

Step 08: The parent router sends the character string to the child router as reply information.

Step 09: The child router receives the reply information sent by the parent router. The child router decrypts the reply information by using the preconfigured private key, and determines whether a result obtained through decryption is the same as the first parameter and the second parameter. If the result is the same as the first parameter and the second parameter, the child router is reset based on the reset instruction to be restored to a delivery state.

In this embodiment of this application, an extended DHCP procedure is used to deliver the reset instruction, and the child router is reset based on the reset instruction.

In an embodiment, when a problem occurs in networking between the child router and the parent router in an actual scenario, the child router may be inserted into the parent router, to resolve a fault through self-recovery. In the self-recovery method, processing efficiency of fault recovery can be improved.

Figure 9:
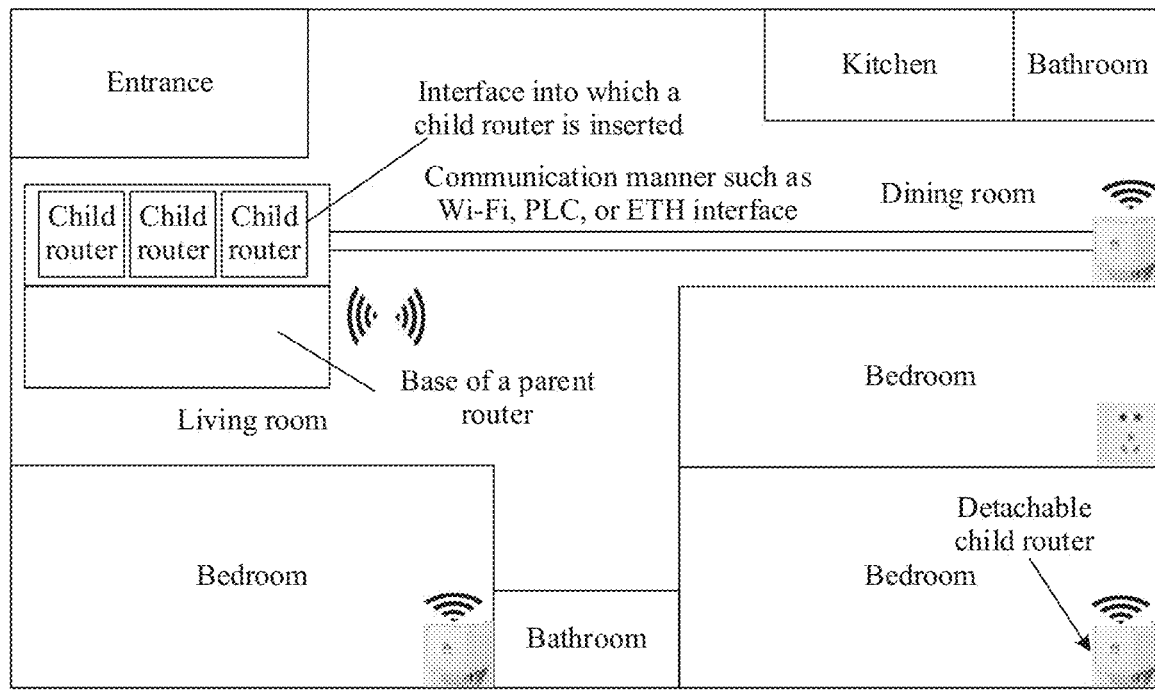
FIG. 9 is a schematic diagram of using detachable and combinable combined routers in an actual scenario according to an embodiment of this application.

FIG. 9 is a schematic diagram of using detachable and combinable combined routers in an actual scenario. As shown in FIG. 9, in a user's house, a parent router is placed in a specific room (for example, a living room), and a child router is inserted into sockets in some rooms (for example, a bedroom) with a poor signal. In addition, the parent router in the living room may be combined with the child router as a whole to provide a plurality of multi-frequency networks of different network segments. It may be understood that, compared with conventional bundled routers, the detachable and combinable combined routers in this application can implement networking during first time of networking, and the networking is not affected by a Wi-Fi coverage area or a factor interfering with Wi-Fi interference, phase crossing of a PLC power line or a factor interfering with the PLC power line, and the like.

Further, when conventional bundled routers are extended by using a single packaged child router, there is no preconfigured parameter due to a security requirement. Therefore, self-networking cannot be completed when a network is extended, and a user needs to manually perform configuration. The detachable and combinable combined routers in this application can implement a plug and play function, and the user does not need to manually perform configuration. Further, when a fault occurs in the detachable and combinable combined routers in this application, the child router may be inserted into the parent router again to be reset, to complete automatic networking.

In this embodiment of this application, network isolation existing between the first network and the second network is used to accurately obtain the networking information from the first network without interference, and a function of automatic networking is implemented by using the networking information. In this manner, during networking between the combined routers, interference of a Wi-Fi coverage area or a factor interfering with Wi-Fi, phase crossing of a PLC power line or a factor interfering with the PLC power line, and the like can be ruled out, to successfully implement automatic networking between the child router and the parent router. In addition, compared with a child router and a parent router in conventional bundled routers, the detachable and combinable combined routers in this embodiment of this application are independent of each other, and the detachable and combinable combined routers can implement a plug and play function, thereby improving efficiency.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

An embodiment of this application further provides a child router, including an access component (such as a plug) corresponding to an interface of a parent router. The access component and the interface of the parent router are used to combine the parent router and the child router or detach the parent router and the child router. The child router includes a processor and a memory. The memory stores program instructions, and when the program instructions are executed by the processor, the child router is enabled to perform the steps performed by the child router in the router networking method in the foregoing embodiment.

An embodiment of this application further provides a parent router, including an interface of the parent router. The interface of the parent router and an access component that is in the child router and that corresponds to the interface of the parent router are used to combine the parent router and the child router or detach the parent router and the child router. The parent router includes a processor and a memory. The memory stores program instructions, and when the program instructions are executed by the processor, the parent router is enabled to perform the steps performed by the parent router in the router networking method in the foregoing embodiment.

An embodiment of this application further provides a router networking apparatus. The apparatus includes several execution modules, and the execution modules enable a child router to perform the steps performed by the child router in the router networking method in the foregoing embodiment.

An embodiment of this application further provides a router networking apparatus. The apparatus includes several execution modules, and the execution modules enable a parent router to perform the steps performed by the parent router in the router networking method in the foregoing embodiment.

An embodiment of this application further provides a non-volatile readable storage medium. The non-volatile readable storage medium stores program instructions, and when the program instructions are executed by a processor, a child router is enabled to perform the steps performed by the child router in the router networking method in the foregoing embodiment.

An embodiment of this application further provides a non-volatile readable storage medium. The non-volatile readable storage medium stores program instructions, and when the program instructions are executed by a processor, a parent router is enabled to perform the steps performed by the parent router in the router networking method in the foregoing embodiment.

It should be clear that the described embodiments are merely some rather than all of embodiments of this application. All other embodiments obtained by a person of ordinary skill in the art based on embodiments of this application without creative efforts shall fall within the protection scope of this application.

It may be clearly understood by a person skilled in the art that, for convenient and brief description, division into the foregoing functional units and modules is merely used as an example for description. In actual application, the foregoing functions can be allocated to different functional units and modules for implementation based on a requirement, that is, an inner structure of the apparatus is divided into different functional units or modules to implement all or some of the functions described above.

The foregoing embodiments are merely intended to describe the technical solutions of this application, but are not to limit this application. Although this application is described in detail with reference to the foregoing embodiments, a person of ordinary skill in the art should understand that the person of ordinary skill in the art may still make modifications to the technical solutions described in the foregoing embodiments or make equivalent replacements to some technical features thereof, without departing from spirit and scope of the technical solutions of embodiments of this application, and these modifications and replacements shall fall within the protection scope of this application.

What is claimed is:

1. A method implemented by a child router and comprising:
   coupling with an interface of a parent router, wherein the interface corresponds to a first network, wherein the first network is isolated from a second network either physically or by software, and wherein the second network is a local area network of the parent router;
   accessing the first network;
   obtaining, in response to accessing the first network, and from the first network, networking information to access the second network;
   uncoupling from the interface;
   coupling with a target interface, wherein the target interface corresponds to the second network; and
   when in a non-delivery state, resetting to the delivery state by:
      randomly generating a first parameter;
      sending the first parameter to the parent router;
      receiving from the parent router, a concatenated parameter;
      decrypting the concatenated parameter using a preconfigured private key;
      sending reset request information to the parent router when a first result obtained through decryption is the same as the first parameter;
      receiving reply information comprising a character string obtained through encryption using the preconfigured public key after the first parameter, the second parameter, and a reset instruction are concatenated; and
      decrypting the reply information using the preconfigured private key; and
      resetting, based on the reset instruction to the delivery state when a second result obtained through decryption is the same as the first parameter and the second parameter;
   when in the delivery state, accessing, based on the networking information, and using the target interface, the second network; and
   extending a signal of the parent router, serving as a first router.

2. The method of claim 1, wherein the first network is of the parent router, and wherein the method further comprises:

coupling a to-be-connected device with the interface using a network cable head or a plug to access the first network, wherein the to-be-connected device comprises the child router; and communicating, by the to-be-connected device, with the parent router using the first network.

3. The method of claim 1, further comprising:

decrypting an encrypted domain password broadcast in the first network to obtain a decrypted domain password; and further accessing, the first network based on the decrypted domain password.

4. The method of claim 1, further comprising:

performing network access authentication using the networking information; and accessing the second network when the networking information meets a condition for accessing the second network.

5. The method of claim 1, wherein the networking information comprises an Ethernet (ETH) connection password, a power line communication (PLC) domain password, or a WI-FI connection password.

6. The method of claim 1, further comprising resetting the child router to the delivery state based on an extended dynamic host configuration protocol (DHCP) procedure.

7. The method of claim 1, wherein the interface of the parent router comprises a network cable interface or a power line interface.

8. A method comprising:

combining a parent router with a child router using an interface of the parent router, wherein the interface corresponds to a first network, wherein the first network is isolated from a second network either physically or by software, wherein the second network is a local area network of the parent router, and wherein after combining the parent router with the child router, the method further comprises:

when the child router is in a non-delivery state, resetting the child router to the delivery state by:
randomly generating a first parameter;
sending the first parameter to the parent router;
receiving from the parent router, a concatenated parameter;
decrypting the concatenated parameter using a preconfigured private key;
sending reset request information to the parent router when a first result obtained through decryption is the same as the first parameter;
receiving reply information comprising a character string obtained through encryption using the preconfigured public key after the first parameter, the second parameter, and a reset instruction are concatenated; and
decrypting the reply information using the preconfigured private key; and
resetting, based on the reset instruction to the delivery state when a second result obtained through decryption is the same as the first parameter and the second parameter;

when the child router is in the delivery state, providing, by the parent router, networking information for the child router using the first network to enable the child router to access the second network based on the networking information; and extending a signal of the parent router using the child router as a first router.

9. The method of claim 8, wherein the interface comprises a network cable interface or a power line interface.

10. The method of claim 8, wherein the first network is of the parent router, and wherein the method further comprises:

coupling a to-be-connected device with the interface using a network cable head or a plug to access the first network; and communicating by the to-be-connected device with the parent router using the first network, wherein the to-be-connected device comprises the child router.

11. The method of claim 8, further comprising receiving an encrypted domain password in the first network to enable the child router to decrypt the encrypted domain password to obtain a decrypted domain password, and to access the first network based on the decrypted domain password to obtain the networking information.

12. The method of claim 8, wherein the networking information comprises an Ethernet (ETH) connection password, a power line communication (PLC) domain password, or a WI-FI connection password.

13. The method of claim 8, further comprising resetting the child router to the delivery state based on an extended dynamic host configuration protocol (DHCP) procedure.

14. A parent router comprising:

an interface configured to, together with an access component that is in a child router and that corresponds to the interface, combine the parent router and the child router and detach the parent router and the child router, wherein the interface corresponds to a first network, wherein the first network is isolated from a second network either physically or by software, wherein the second network is a local area network of the parent router; and a processor coupled to the interface and configured to:
reset, when the child router is in a non-delivery state, the child router to the delivery state; and
provide, when the child router is in the delivery state, networking information for the child router using a first network to enable the child router to access a second network based on the networking information and to serve as a router for extending a signal of the parent router.

15. The parent router of claim 14, wherein the interface comprises a network cable interface or a power line interface.

16. The parent router of claim 14, wherein the first network is of the parent router, and wherein the processor is further configured to:

couple a to-be-connected device with the interface using a network cable head or a plug to access the first network; and communicate using the to-be-connected device with the parent router using the first network, wherein the to-be-connected device comprises the child router.

17. The parent router of claim 14, wherein the processor is further configured to broadcast an encrypted domain password in the first network to enable the child router to decrypt the encrypted domain password to obtain a decrypted domain password and to access the first network based on the decrypted domain password to obtain the networking information.

18. The parent router of claim 14, wherein the networking information comprises an Ethernet (ETH) connection password, a power line communication (PLC) domain password, or a WI-FI connection password.

19. The parent router of claim 14, wherein the processor is further configured to cause the child router to reset to the delivery state by:
- randomly generating a first parameter;
- sending the first parameter to the parent router;
- receiving from the parent router, a concatenated parameter;
- decrypting the concatenated parameter using a preconfigured private key;
- sending reset request information to the parent router when a first result obtained through decryption is the same as the first parameter;
- receiving reply information comprising a character string obtained through encryption using the preconfigured public key after the first parameter, the second parameter, and a reset instruction are concatenated; and
- decrypting the reply information using the preconfigured private key; and
- resetting, based on the reset instruction to the delivery state when a second result obtained through decryption is the same as the first parameter and the second parameter.

20. The parent router of claim 14, wherein the processor is further configured to cause the child router to reset to the delivery state based on an extended dynamic host configuration protocol (DHCP) procedure.

\* \* \* \* \*